(12) United States Patent
Mueller (10) Patent No.: US 8,381,717 B2
(45) Date of Patent: Feb. 26, 2013

(54) SYSTEM FOR SOLAR HEATING WATER USING A GLASS ABSORBER

(76) Inventor: Mark A. Mueller, Menlo Park, CA (US)

( * ) Notice: Subject to any disclaimer, the term of this patent is extended or adjusted under 35 U.S.C. 154(b) by 1119 days.

(21) Appl. No.: 12/326,995

(22) Filed: Dec. 3, 2008

(65) Prior Publication Data

US 2010/0132697 A1    Jun. 3, 2010

(51) Int. Cl.
*F24J 2/00* (2006.01)
(52) U.S. Cl. ............................................... 126/569
(58) Field of Classification Search ............... 126/569
See application file for complete search history.

(56) References Cited

U.S. PATENT DOCUMENTS

| | | | |
|---|---|---|---|
| 2,680,565 A * | 6/1954 | Lof | 126/591 |
| 4,038,965 A | 8/1977 | Lyon | 126/271 |
| 4,052,974 A | 10/1977 | Vataru | 126/270 |
| 4,062,351 A | 12/1977 | Hastwell | 126/271 |
| 4,108,373 A | 8/1978 | Chiapale et al. | 237/1 A |
| 4,184,481 A * | 1/1980 | Tornquist | 126/585 |
| 4,262,657 A | 4/1981 | McCullough | |
| 4,274,395 A * | 6/1981 | Bangs | 126/634 |
| 4,279,244 A | 7/1981 | McAlister | 126/450 |
| 4,281,639 A * | 8/1981 | Kuronen | 126/629 |
| 4,297,989 A * | 11/1981 | Wozny et al. | 126/648 |
| 4,353,357 A * | 10/1982 | Nelson | 126/621 |
| 4,355,629 A | 10/1982 | Cornell, III | 126/437 |
| 4,531,511 A | 7/1985 | Hochberg | 126/450 |
| 4,942,865 A | 7/1990 | Pierce-Bjorklund | |
| 4,971,029 A | 11/1990 | Dormann | 126/450 |
| 5,217,000 A | 6/1993 | Pierce-Bjorklund | |
| 7,143,762 B2 * | 12/2006 | Harrison et al. | 126/589 |

* cited by examiner

*Primary Examiner* — Eric Keasel
(74) *Attorney, Agent, or Firm* — Carla Gannon Law (57) ABSTRACT

A system of passively heating water using solar energy and an absorber formed from two identical halves of molded darkened glass that are fused together. The absorber is essentially a plurality of black glass struts that are sandwiched between two black glass surfaces. The struts act as baffle plates and define cells. Water is carried through the system via the thermosiphoning effect.

13 Claims, 9 Drawing Sheets

SYSTEM FOR SOLAR HEATING WATER USING A GLASS ABSORBER

BACKGROUND (1) Field

The present invention relates generally to heating water using solar energy and, more particularly, to an absorber formed from two identical halves of darkened glass that are fused together.

(2) Related Art

Small-scale solar water heating systems are typically constructed of an insulating housing, including a window which permits solar radiation to enter the housing, and a solar collector. Solar collectors are also known as "absorbers". Solar water heaters are generally categorized as active or passive. Active heaters pump water from a reservoir, such as a tank or pool, to the solar collector where the water is heated, then onto the desired destination. These systems require various controllers, including water flow controllers, since a relatively small volume of water resides in the solar collector, and this water, if overheated, could easily damage or destroy the delicate collector. Pool heaters and flat panel water heaters commonly seen on roofs are usually active solar heaters. As of the date of filing this application, a typical active solar water heater designed to meet most of the water heating the needs of a family of four costs approximately $7,000US to $9,000US fully installed in the US. In the San Francisco Bay Area, the annual energy expenditure for "conventionally" heating water for a family of four is approximately $400US.

Passive water heaters are generally less structurally sophisticated insofar as they lack pumping and precise water flow controllers. Instead, water is moved via the thermosiphoning effect through a large solar collector which also serves as a storage tank, then onto the desired location. A very simple version of this is found in many tropical locations, such as southern China, where uninsulated black tanks are often placed on roofs to simultaneously store and heat water. Without insulation, however, the hot water must be consumed during the solar day. As of the filing date of this application, more sophisticated passive water heaters, which are generally capable meeting heated water needs of a family of four in the US, cost approximately $7,000US installed in the Bay Area.

Many potential consumers consider solar heating systems to be cost prohibitive. This hurdle to ownership is compounded because the projected financial break-even point for solar heating systems is in the decades. Accordingly, solar heating systems are generally considered to be environmentally friendly but financially unfriendly investments. This is unfortunate given the myriad of problems associated with the consumption of non-renewable energy sources.

Copper is widely considered the material of choice in solar water heating systems. It is bendable, can be soldered and brazed, undergoes minimal corrosion, and does not pose water-related toxicity concerns. However, copper is quite expensive, trading as a commodity in the $2.00 to $4.00US range in the three years prior to filing this application. In short, the cost of copper is a major hurdle to solar heating system ownership for many consumers. In some solar heaters, aluminum may be used in place of part of the copper to reduce cost, but this adds substantially to assembly costs. The other major cost contributor to solar heating systems is the labor associated with manufacturing. Typically systems include a multitude of delicate parts that must be assembled with precision because sloppy assembly will lead to leaks and system failure.

Thus, there remains a need for a new and improved solar water heating system that is economically feasible for consumers. Ideally this system would be relatively simple and inexpensive to manufacture, be constructed of environmentally friendly and inexpensive materials, and not be any more difficult to install than already known solar water heating systems. This new and improved solar water heating system should also perform as well as current systems with respect to temperature and availability of water, longevity of system and aesthetics.

SUMMARY OF THE INVENTIONS

The present invention is directed to heating water using solar energy and, more particularly, to an absorber formed from two identical halves of molded darkened glass that are fused together.

Accordingly, one aspect of the present inventions is to provide a passive system for solar heating water that is affordable for most consumers and will pay for itself in under 10 years.

Another aspect of the present invention is to construct the system using environmentally friendly materials that are readily available.

Yet another aspect of the present invention is to provide a system that is as reliable, efficacious, aesthetically pleasing and easy to install as other, much more expensive systems.

Still another aspect of the present invention is to facilitate water's capture of solar energy with cells formed of darkened glass, and facilitate movement of that water via the thermosiphoning effect.

Another aspect of the present invention is to teach a method of forming a monolithic glass absorber of two identical sides that are easy to manufacture and assemble.

These and other aspects of the present inventions will become apparent to those skilled in the art after a reading of the following description of the preferred embodiment when considered with the drawings.

BRIEF DESCRIPTION OF THE DRAWING

FIG. 9 is a schematic top cross-sectional view of the interior of the absorbers in the preferred embodiment, schematically showing the side cross-sectional views of the absorber baffles extending therefrom as FIG. 9a.

DESCRIPTION OF THE PREFERRED EMBODIMENTS

In the following description, like reference characters designate like or corresponding parts throughout several views.

Figure 1:
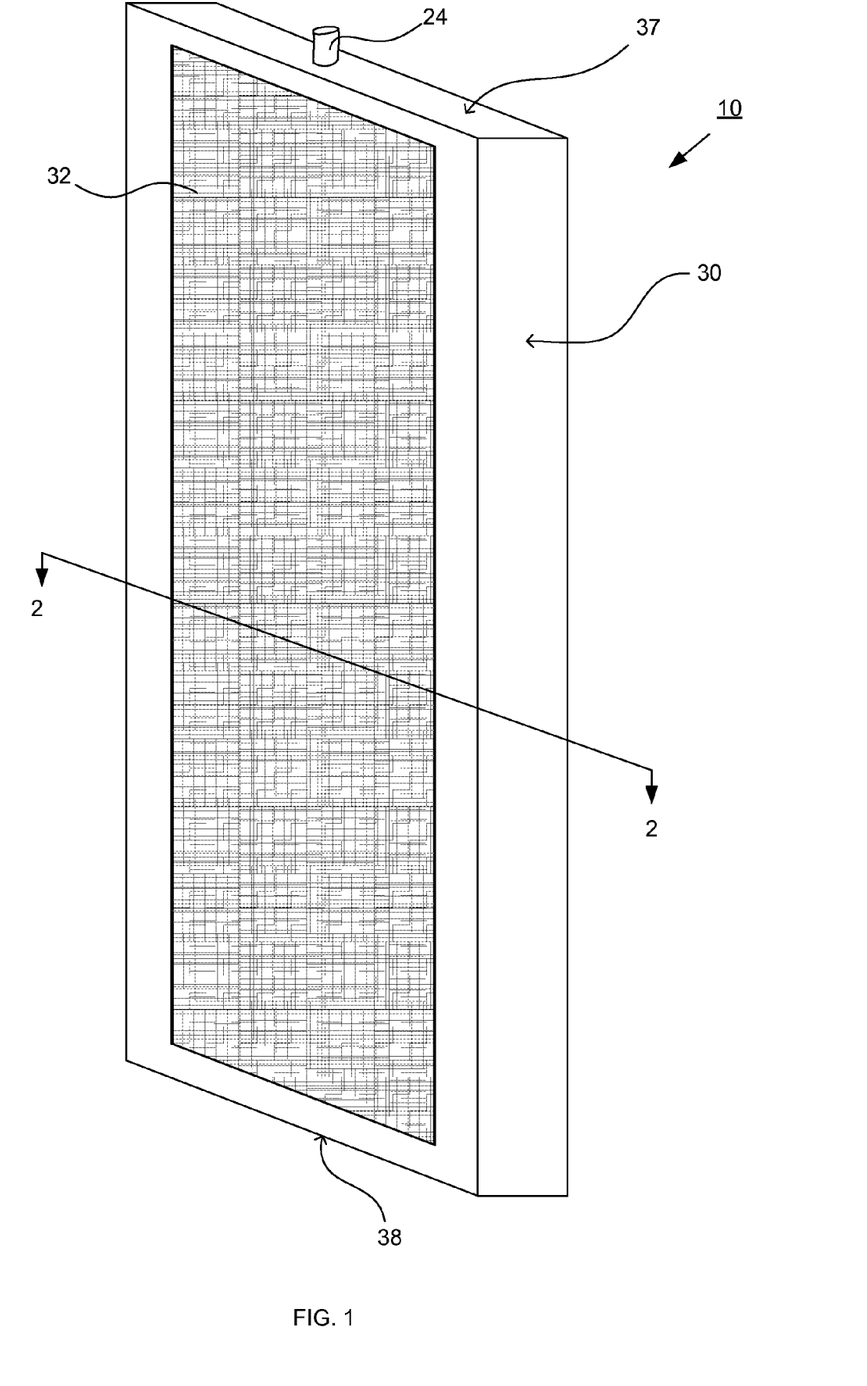
FIG. 1 is a perspective view of the exterior of the system.
Figure 6:
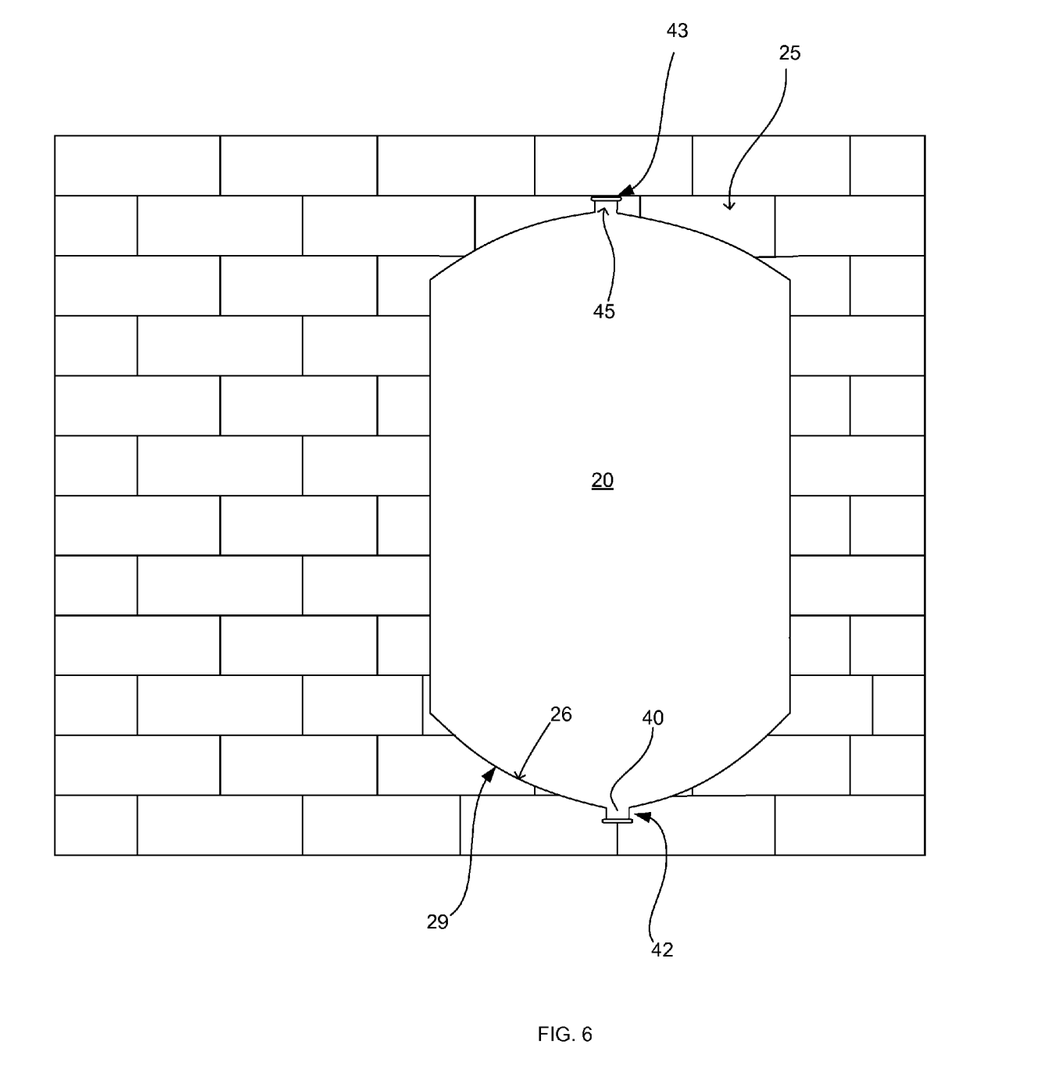
FIG. 6 is a schematic perspective view of the exterior of the absorber in situ with the inlet and outlet connectors attached.

Referring now to the drawings in general and FIG. 1 in particular, it will be understood that the illustrations are for the purpose of describing a preferred embodiment of the invention and are not intended to limit the invention thereto. As best seen in FIG. 1, system 10 includes housing 30 with housing top portion 37 oriented upwardly and housing bottom portion 38 oriented downwardly. This orientation coincides with how system 10 is intended to be mounted in situ, for example on a slanted roof, although nearly horizontal mounting would also work so long as outlet 45 is oriented on absorber upper portion 25 and inlet 40 is oriented on absorber lower portion 26, as shown in FIG. 6. Outlet sleeve 24 preferably extends through housing top portion 37. The preferred size of system 10 is approximately 4'×8'×8".

Figure 2:
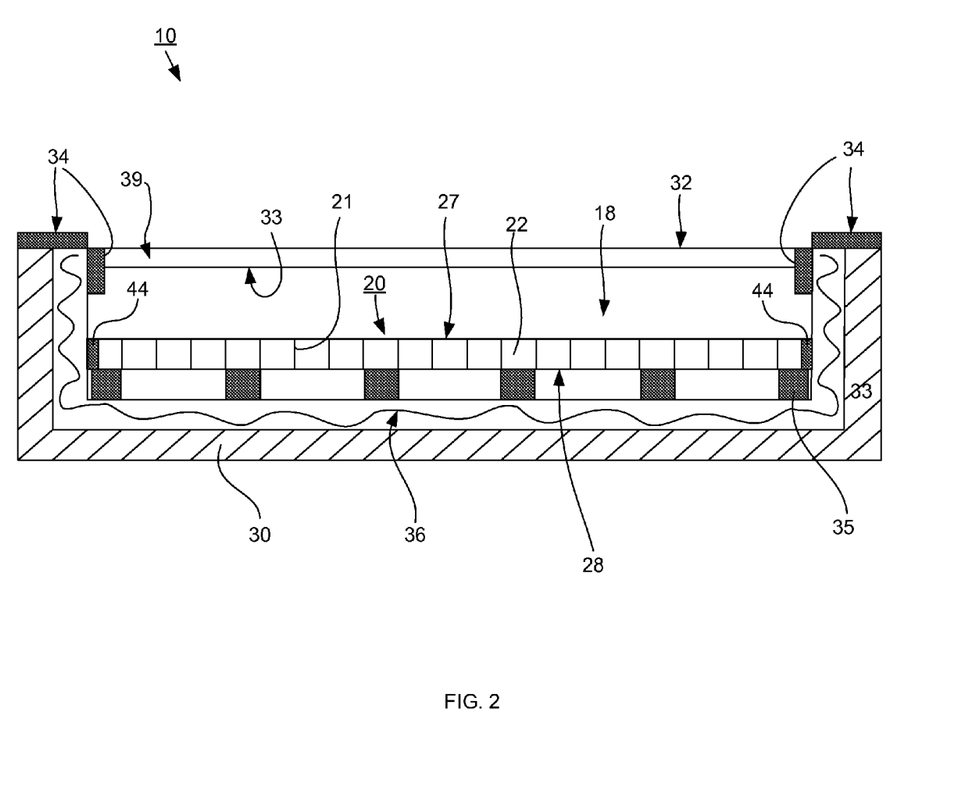
FIG. 2 is a side cross-sectional view of the interior in one embodiment of the system, as taken along line 2-2 of FIG. 1.
Figure 3:
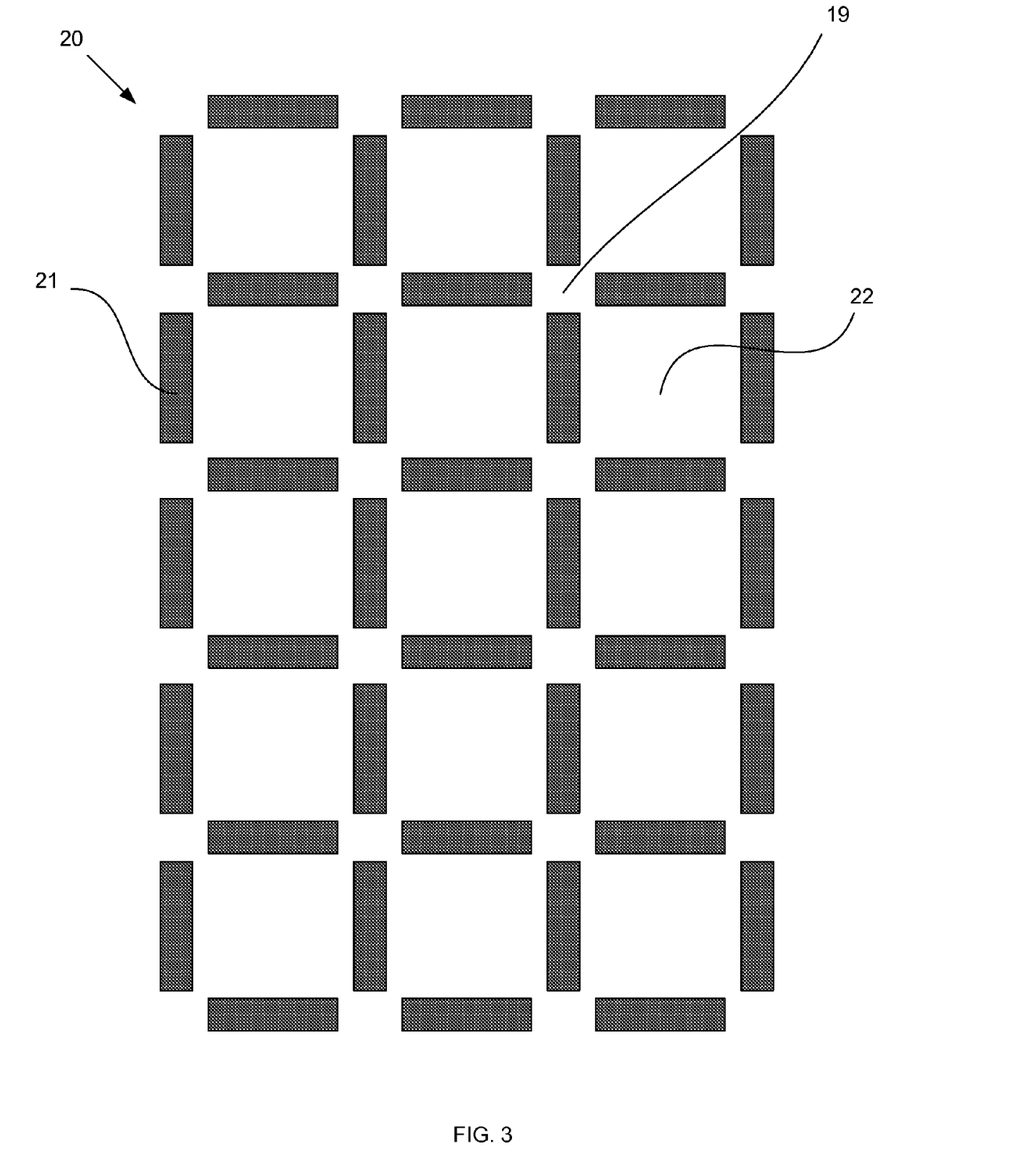
FIG. 3 is a schematic top cross-sectional view of the absorber in one embodiment of the system.
Figure 4:
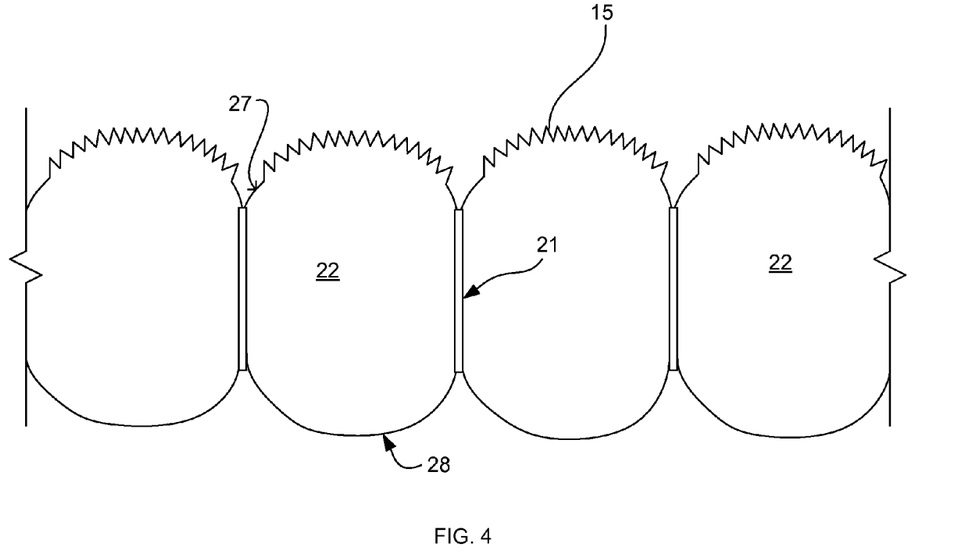
FIG. 4 is a schematic side cross-sectional view of a portion of absorbers in one embodiment.
Figure 5:
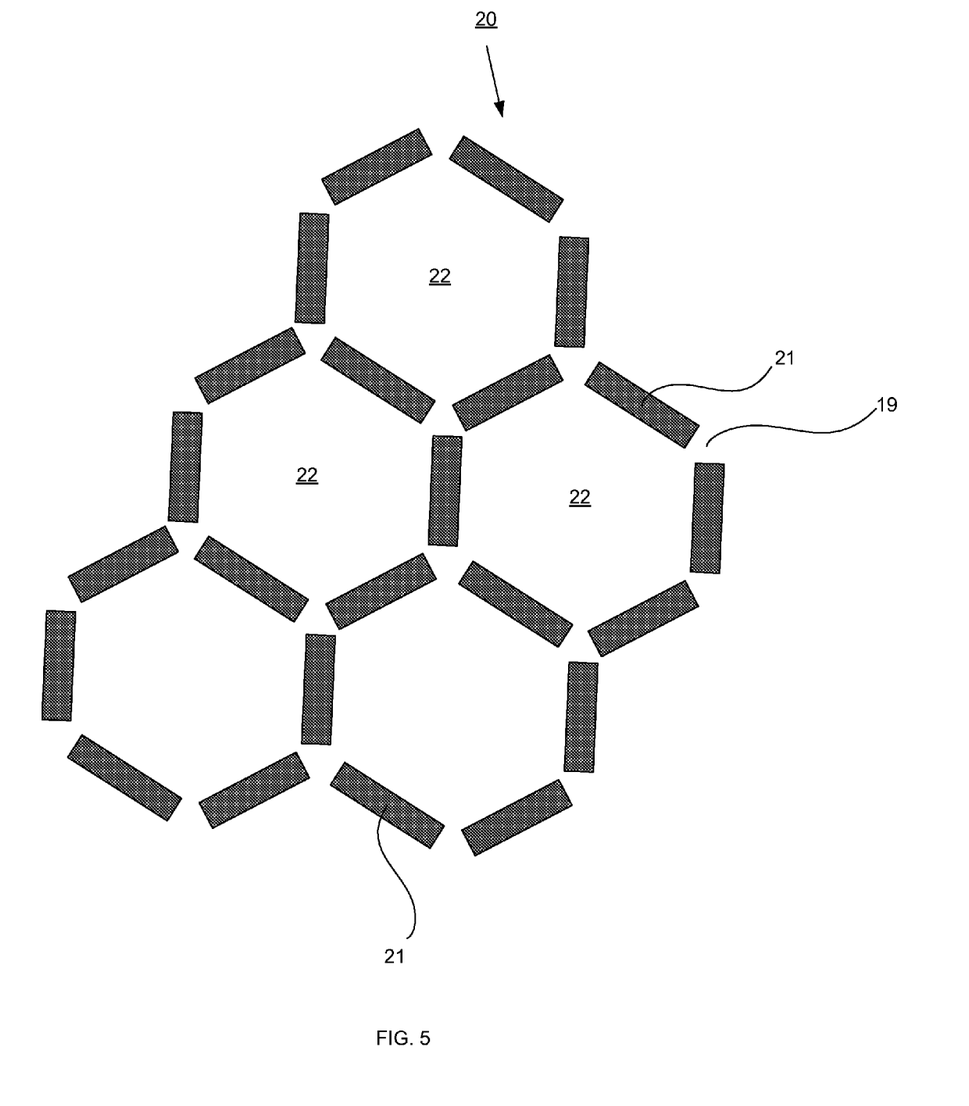
FIG. 5 is a schematic top cross-sectional view of the interior of absorbers in one embodiment.

FIG. 2 is a not-to-scale cross-sectional view taken along reference lines 2-2 of FIG. 1, depicting the orientation of absorber 20 within housing 30, and various structures associated therewith. Starting outwardly, outer pane 32 would be exposed directly to sunlight and the environment in situ, and is separated from inner pane 33 by an air gap 39 which is preferably approximately 1 to 2 inches thick. Outer pane 32 and inner pane 33 are preferably made of tempered glass, but standard glass or weather and UV resistant plastic such as SABIC Innovative Plastics' LEXAN® (polycarbonate) would also be suitable. Preferably panes 32 and 33 are approximately ⅛ to ¼ inches thick. Panes 32 and 33 are preferably held in position by pane supports 34. Continuing inwardly, inner pane 33 is separated from upper surface 27 of absorber 20 by about 1 inch of space 18. Struts 21 connect upper surface 27 to lower surface 28 of absorber 20, best shown in FIG. 4, and define cells 22, which are best illustrated in FIGS. 3-5. Struts 21 provide integrity by preventing distortion of absorber surfaces 27 and 28 due to water pressure, while also contributing to the structural integrity of the system. Turning back to FIG. 2, optionally beneath lower surface 28 is at least one spacer 35 to help prevent the unwanted escape of heat from absorber 20. Beneath lower surface 28 (and optionally spacers 35) is insulation 36. Preferably insulation 36 is an approximately 1 to 2 inches thick layer of polyisocyanurate, but other insulators such as high temperature fiberglass would be suitable as well. Insulation 36 is adjacent housing 30. Optionally, side perimeter insulation foam 44 abuts edges of absorber.

Upper surface 27, lower surface 28 and struts 21 are all comprised substantially of glass. Glass is a very unlikely material for an absorber given its reputation as an insulator, but the inventor has unexpectedly discovered that it makes an excellent absorber. Specifically, it is inert, does not corrode, can withstand extremely high temperatures and fluctuations, and does not impart impurities or taste to water. Moreover, glass manufacturing methods are well known and easily adapted to the present invention, glass is very inexpensive (as low as $5/ton at time of filing for post-consumer scrap glass), and not susceptible to commodity price spikes. Preferably the glass is post-consumer glass containing a black pigment so it exhibits a transparency value of less than 10%, however other non-clear glass would also be suitable. Alternatively, it is possible to coat the glass with a darkening agent. Used herein, "darkened glass" shall generically refer to glass that is pigmented, non-clear, coated with a darkening agent, and/or combinations thereof. The preferred pigment is iron oxide ($Fe_2O_3$) but copper oxide, manganese oxide, nickel oxide and other metal oxides and mixtures thereof are also suitable. Iron Oxide is sometimes produced as a waste product from other industrial processes, and thus is advantageously economical and "green". An acceptable black pigmented glass could be created by combining approximately 90% scrap soda lime glass with about 7% iron oxide plus several percent of other metal oxides such as copper, manganese, or nickel oxides. In some applications of this absorber, it may be more appropriate to utilize thermal shock resistant borosilicate glass or types of glass other than recycled soda lime container glass.

Cells 22 can be square, cylindrical or hexagonal, as shown in FIGS. 3-5 respectively, noting that FIG. 4 is in cross-section. Cells 22 are substantially bordered by struts 21, with gaps 19 permitting the flow of water between cells, as necessary to achieve the thermosiphoning effect. Although not shown, struts 21 of cylindrical cells have holes through which water flows horizontally between cells. In other words, gaps 19 are defined by struts 21 for cylindrical cells, while gaps 19 for square and hexagonal cells 22 are defined by the space between struts 21.

Figure 9:
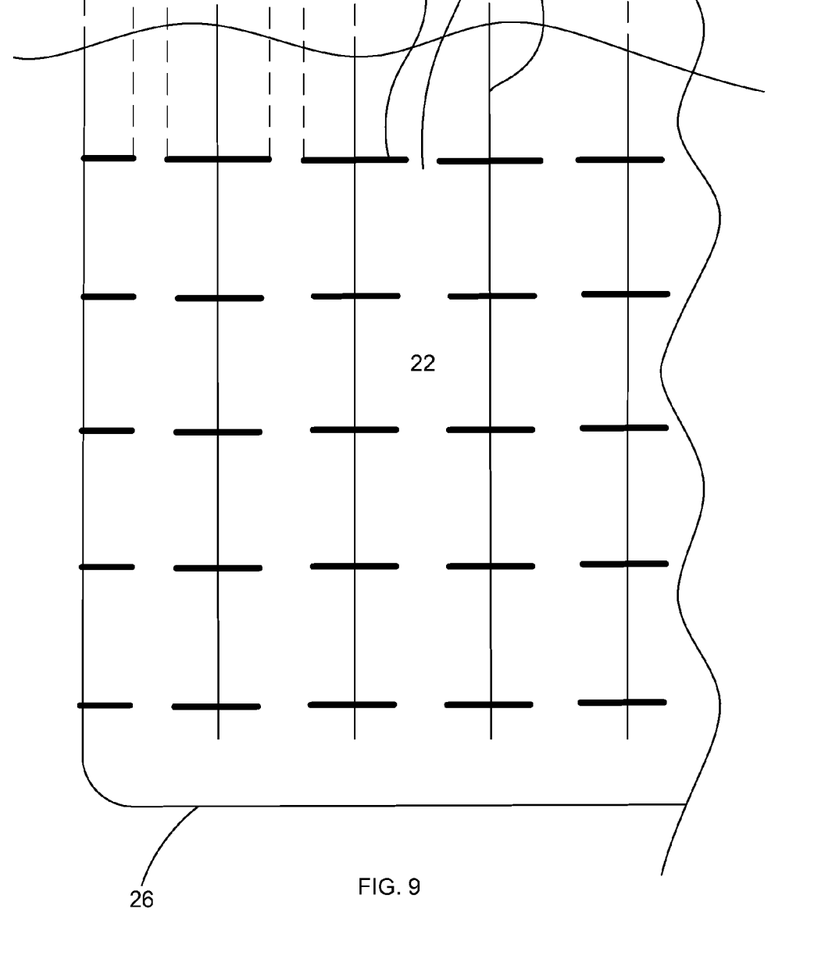
Figure 9A:
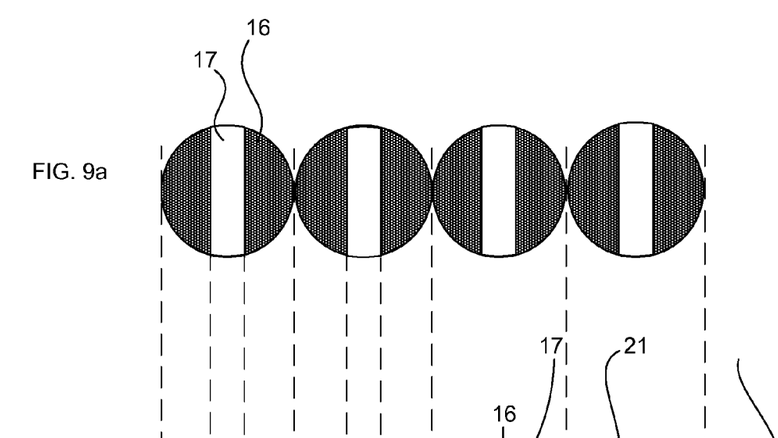

FIG. 9 depicts the preferred embodiment and includes baffles 16 substantially perpendicular to struts 21. In this embodiment cells 22 are cylindrical and longitudinally separated by struts 21 which define gaps 19 (not shown). Baffles 16 define slots 17, which facilitate emptying of system 10 when desired for cleaning, winterizing, etc. Preferably slots traverse baffles vertically all the way from top to bottom, as shown in FIG. 9a.

Cells 22 are preferably approximately ½ to approximately 10 inches wide, with approximately 1 to approximately 6 inches being more preferred and approximately 2 to approximately 4 inches being most preferred. Struts 21 are preferably approximately ⅛ to approximately 1 inch thick, with approximately ¼ to approximately ¾ inches being more preferred and approximately ⅜ to approximately ½ inches being most preferred. Preferably upper surface 27 is a texturized surface 15, as shown in FIG. 4, to trap sunlight. Texturizing could be introduced after the absorber is formed, or preferably during the molding process itself. Although FIG. 4 shows only upper surface 27 texturized, it should be understood that texturized surface 15 would likewise be on lower surface 28 if texturizing were created during the molding process since both halves would be identical. Preferably struts 21 are approximately ½ to approximately 10 inches tall (measured from absorber upper potion 25 and absorber lower portion 26, best shown in FIG. 2), more preferably approximately 1 to approximately 6 inches tall and most preferably approximately 2 to approximately 4 inches. Preferably the outer glass thickness of absorber upper potion 25 and absorber lower portion 26 are approximately 1/16 to approximately 1 inch thick, with approximately ⅛ to approximately ⅝ inches being more preferred and approximately ¼ to approximately ⅜ inches being most preferred.

Figure 7:
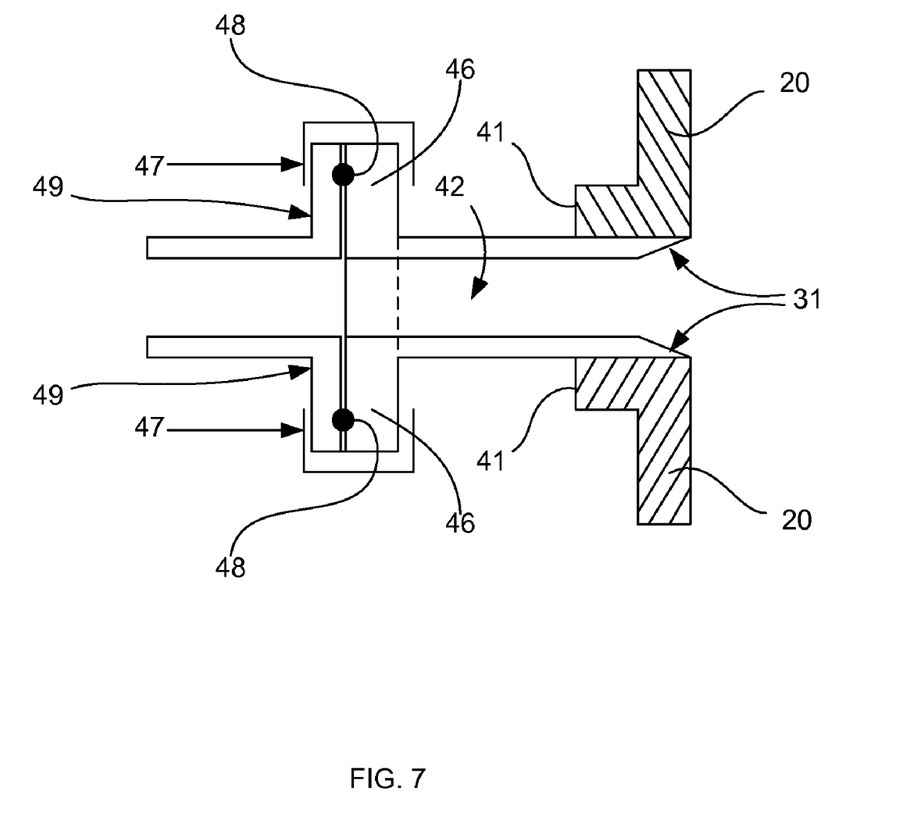
FIG. 7 is a cross-sectional view demonstrating attachment of absorber to inlet connector to copper tubing.

FIG. 6 schematically depicts absorber 20 placed on a roof (without an outer insulating housing) with absorber upper portion 25 oriented upwardly, absorber lower portion 26 oriented downwardly, inlet connector 42 joined to inlet 40, and outlet connector 43 joined to outlet 45. As shown in FIG. 7, inlet connector 42 is a not an integral part of absorber 20. Rather inlet connector 42 (and outlet connector 43) slips into lip 41 of absorber 20. Connectors 42 and 43 are preferably made of glass of exactly the same composition of glass in absorber 20, and can be affixed to absorber 20 by fusion, adhesives and other conventional methods which would be long lasting and maintain integrity in the environment. As set forth in FIG. 7, flange 46 abuts the end of copper tubing 49, and is preferably secured with o-ring 48 and clamp 47. Flared channel 31, as best shown in FIG. 7, and downwardly sloping bottom 29, as best shown in FIG. 6, collectively assist in achieving complete drainage in the event the system requires manual draining for severe weather, maintenance, etc. It should be noted that the aforementioned description regarding inlet connector 42 and associated attachments and features may apply likewise to outlet connector 43, but detailed discussion of the latter have been omitted for conciseness. In situ, copper tubing 49 connected to inlet is connected to the water main, and the outlet is connected to indoor plumbing. Water is moved through system 10 when hot water tap is turned on in the building.

Housing 30 is essentially a "rectangular box" with one of the sides comprising at least one pane of glass (outer pane 32), and preferably lined on non-paned interior sides with insulation 36. The non-paned sides of housing 30 may be constructed of wood, metal, plastic, alloys, fiberglass, polymers, or combinations thereof, but anodized aluminum is the preferred material. Housing top portion 37 and housing bottom portion 38 preferably define apertures through which structures associated with inlet 40 and outlet 45 (such as, for example, inlet connector 42, outlet connector 43, flange 46, lip 41) may protrude through so to connect absorber 20 with copper tubing 49

Figure 8:
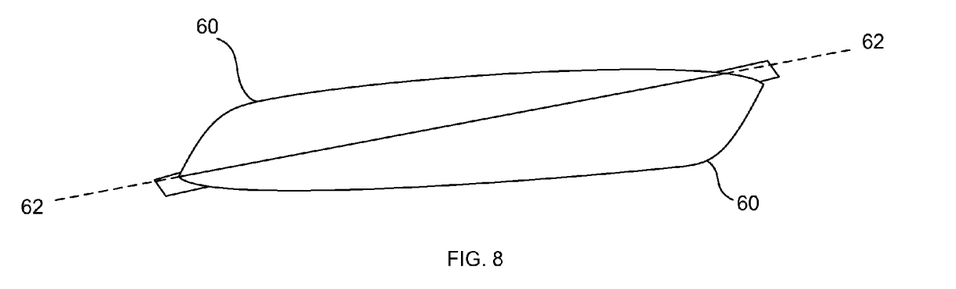
FIG. 8 is a schematic side view of two molded glass halves fused together.

As discussed above, the present invention is much more economical than other solar water heating systems currently available because the primary material used in its construction is glass, as opposed to copper. However, the novel manufacturing method also lowers the price of the system because the present invention does not include the complicated and labor intensive interconnection of vessels and tubes found in known systems, but rather a monolithic absorber which is comprised of two identical molded glass pieces that have been fused together to form an effective absorber. Specifically, as depicted in FIG. 8, molded glass half 60 is joined to an identical molded glass half 60 and fused along intersection plane 62. Each glass half 60 individually comprises "half struts" connected to a "surface", thereby defining "half cells" (with 5 sides for square cell embodiment), and "half gaps" associated therewith. The "surface" ultimately becomes upper surface 27 or lower surface 28, depending on whether molded glass half 60 becomes a "top" or "bottom". Corresponding parts must be aligned with precision prior to fusing to ensure, for example, "half struts" and "half gaps" are properly abutted one to another to permit desired thermosiphoning effect.

Molding and joining diagonally bisected halves to achieve offset inlet and outlet sleeves 23 and 24, as shown in FIG. 8, is preferred because it facilitates drainage. However, it would alternatively be possible to mold and join two depth-, length- or width-bisected halves to form monolithic absorber 20.

It should be understood that there is no functionality associated with using darkened glass (versus clear glass) to construct molded glass half 60 that will ultimately be the "bottom half". However, using darkened glass for both halves ("top half" and "bottom half") is preferable for ease of manufacturing, particularly given the almost negligible price associated with darkening the glass. Also, by manufacturing both top and bottom halves using glass with exactly the same composition, the final product contains a uniform coefficient of thermal expansion, in order to reduce stress during thermal cycles, both in the manufacturing process and in water heating.

Certain modifications and improvements will occur to those skilled in the art upon a reading of the foregoing description. By way of example, it is possible to use the novel glass absorber without the insulating housing as a pool water heater in place of less-durable plastic which is typically used for this application. Also it is possible to use the novel glass absorber panels as a building-integrated roofing material for heating or pre-heating water, or for removing heat from roofs in hot climates. Also, it is possible to use the glass absorbers in low volume active collectors. It should be understood that all such modifications and improvements have been deleted herein for the sake of conciseness and readability but are properly within the scope of the following claims.

I claim:

1. A system for solar heating water, said system comprising:
   a. a housing including a dual paned window having an inner pane separated from an outer pane by an air gap of approximately 1 to 2 inches thick;
   b. a uniformly pigmented glass absorber within said housing, said glass absorber containing at least one metal oxide pigment, and including a plurality of cells each having a texturized upper surface and forming an approximately 1 inch space between said inner pane and said upper surface;
   c. at least one inlet in fluid communication with said glass absorber; and
   d. at least one outlet in fluid communication with said glass absorber.

2. The system of claim 1 wherein said at least one metal oxide pigment includes iron oxide ($Fe_2O_3$).

3. The system of claim 1 wherein said glass absorber defines a downwardly sloping bottom in communication with said inlet.

4. The system of claim 3 wherein said inlet is oriented downwardly.

5. The system of claim 4 wherein said outlet is oriented upwardly.

6. The system of claim 1 wherein said plurality of cells are defined by a plurality of struts.

7. The system of claim 6 wherein said plurality of struts are constructed of glass containing at least one metal oxide pigment.

8. The system of claim 6 wherein said plurality struts are individually separate one from another.

9. The system of claim 6 further comprising a plurality of baffles substantially perpendicular to said struts.

10. The system of claim 9 wherein said baffles define slots.

11. The system of claim 10 wherein said slots vertically traverse said baffles.

12. The system of claim 1 wherein said glass absorber is constructed of two identical halves.

13. The system of claim 1 wherein the shape of each cell in said plurality of cells is selected from square, cylindrical and hexagonal.

* * * * *